(12) United States Patent
Koitabashi

(10) Patent No.: US 7,532,788 B2
(45) Date of Patent: May 12, 2009

(54) CONTACTLESS CONNECTOR

(75) Inventor: Hiroyuki Koitabashi, Komaki (JP)

(73) Assignee: Chubu Nihon Maruko Co., Ltd., Komaki (JP)

(*) Notice: Subject to any disclaimer, the term of this patent is extended or adjusted under 35 U.S.C. 154(b) by 531 days.

(21) Appl. No.: 11/293,329

(22) Filed: Dec. 2, 2005

(65) Prior Publication Data

US 2006/0133799 A1    Jun. 22, 2006

(30) Foreign Application Priority Data

Dec. 17, 2004  (JP) ............... 2004-365483
Sep. 26, 2005  (JP) ............... 2005-277565

(51) Int. Cl.
*G02B 6/26* (2006.01)
*G02B 6/42* (2006.01)
*H01R 39/08* (2006.01)

(52) U.S. Cl. ............... 385/26; 385/24; 385/47; 385/50; 310/232

(58) Field of Classification Search ............... 385/24, 385/26, 39, 47, 50; 310/232
See application file for complete search history.

(56) References Cited

U.S. PATENT DOCUMENTS

| | | | | |
|---|---|---|---|---|
| 4,447,114 A | * | 5/1984 | Koene | ............... 385/26 |
| 4,530,567 A | * | 7/1985 | Simon | ............... 385/25 |
| 6,353,693 B1 | | 3/2002 | Kano et al. | |
| 6,614,016 B1 | * | 9/2003 | Degen | ............... 250/231.1 |

FOREIGN PATENT DOCUMENTS

| | | |
|---|---|---|
| EP | 0 488 205 | 6/1992 |
| JP | 57-138231 | 8/1982 |
| JP | 60-40002 | 9/1985 |
| JP | 60-206334 | 10/1985 |
| JP | 61-24961 | 7/1986 |
| JP | 3-16060 | 3/1991 |
| JP | 04-204608 | 7/1992 |
| JP | 5-134140 | 5/1993 |
| JP | 08-160326 | 6/1996 |
| JP | 09-308625 | 12/1997 |
| JP | 2002-075760 | 3/2002 |
| JP | 2002-280239 | 9/2002 |

* cited by examiner

*Primary Examiner*—Frank G Font
*Assistant Examiner*—Michael P Mooney
(74) *Attorney, Agent, or Firm*—Greer, Burns & Crain, Ltd.

(57) ABSTRACT

A contactless connector which secures continuity of communication is provided. A contactless connector comprises a rotating-side light element on a rotating body which rotates about a rotation axis, and a fixed-side light element on a fixed body which is fixed in place; further, the rotating body comprises a reflecting body which rotates about the rotation axis. Two light elements are configured such that when a particular fixed-side light element is positioned on the light path line segment on which light emitted from a particular rotation-side light element is reflected by the reflecting body, a light path is formed between the two light elements. The reflecting body rotates at half the rotation speed of the rotating body.

15 Claims, 14 Drawing Sheets

10 CONTACTLESS CONNECTOR

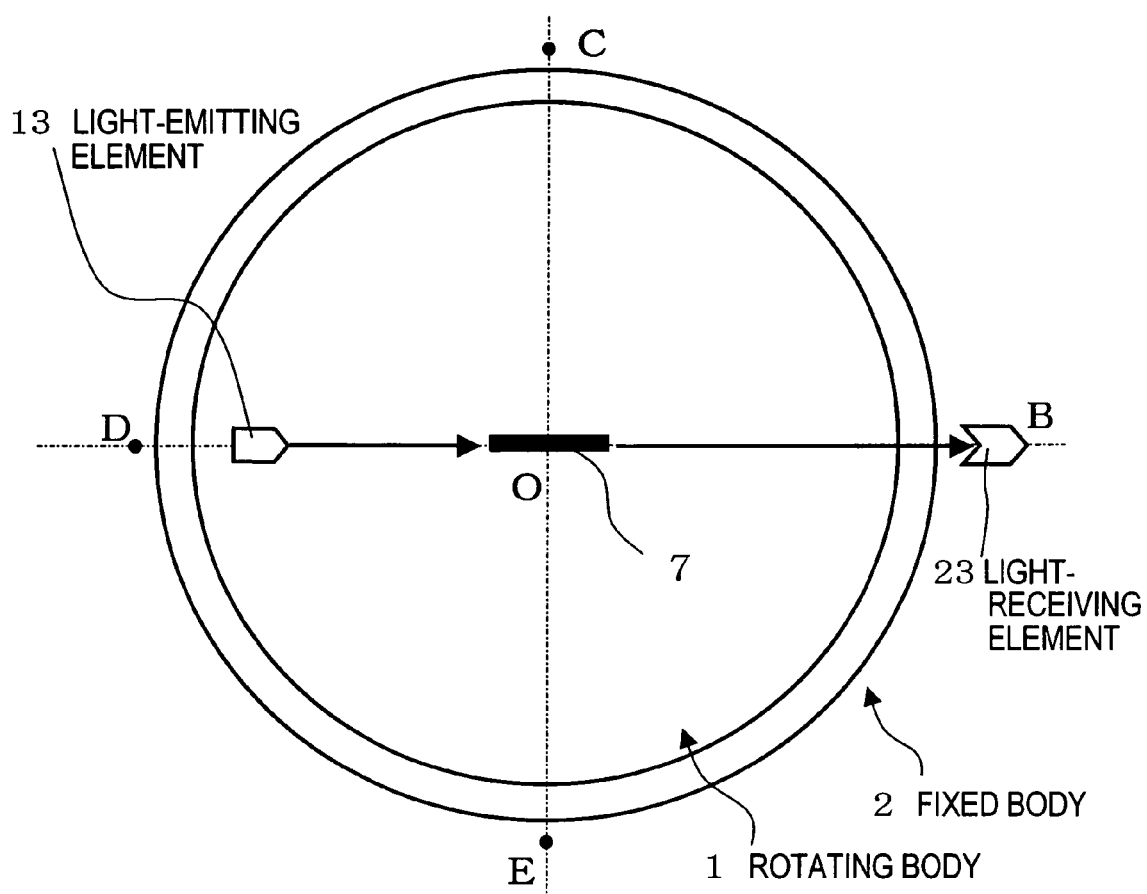

10 CONTACTLESS CONNECTOR

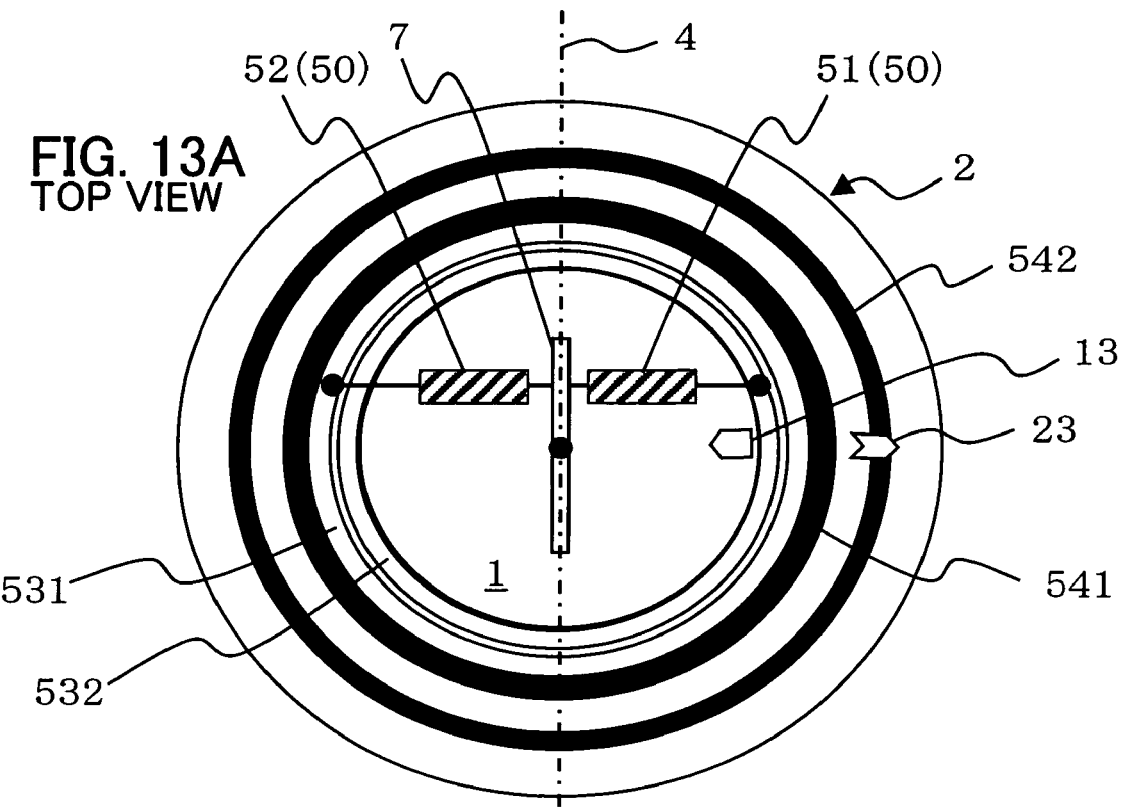
FIG. 13A TOP VIEW
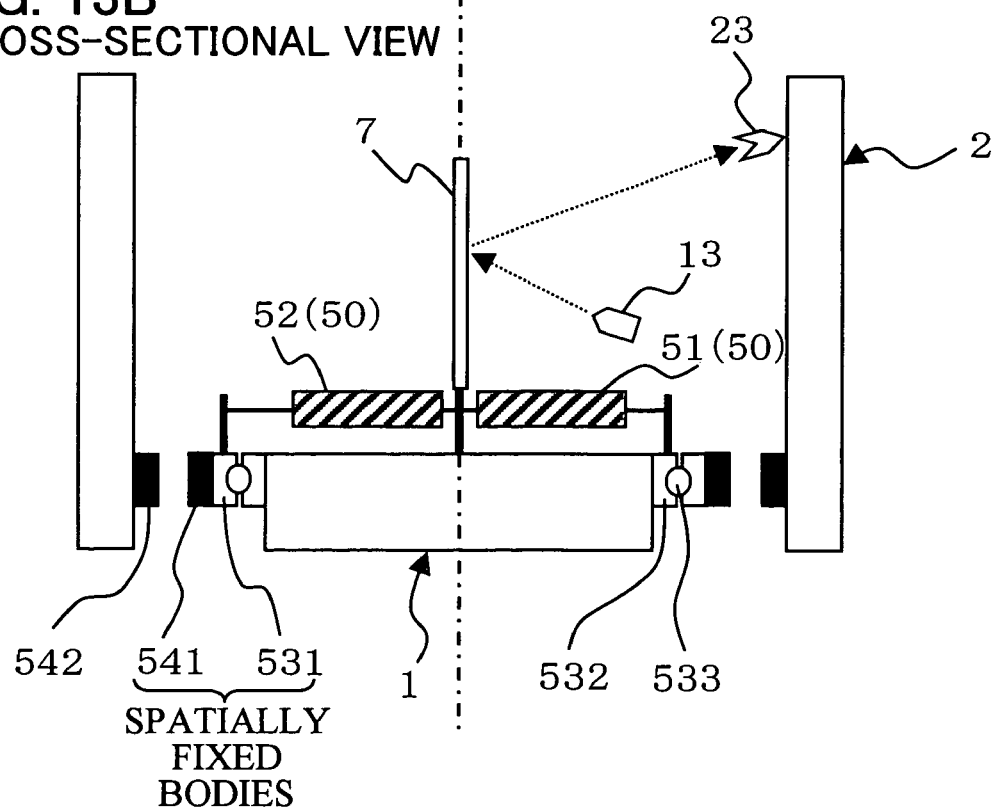
FIG. 13B CROSS-SECTIONAL VIEW
SPATIALLY FIXED BODIES

CONTACTLESS CONNECTOR

CROSS-REFERENCE TO RELATED APPLICATIONS

This application is based upon and claims the benefit of priority from the prior Japanese Patent Application No. 2004-365483, filed on Dec. 17, 2004, and the prior Japanese Patent Application No. 2005-277565, filed on Sep. 26, 2005, the entire contents of which are incorporated herein by reference.

BACKGROUND OF THE INVENTION

1. Field of the Invention

The present invention relates to a contactless connector which contactlessly sends and receives data, in particular, to contactless connector which contactlessly sends and receives data between a light element of a rotating body and a light element of a fixed body, via a reflector provided on the rotation axis of the rotating member.

2. Description of the Related Art

In the prior art, data has been sent and received between a rotating side and a fixed side. For example, a camera may be provided on a rotatable base, and a video signal or similar from the camera transmitted to a fixed-side signal processing portion. In this case, by directly connecting the camera and signal processing portion by wire, the video signal from the camera have been transmitted to the fixed-side signal processing portion. However, with the advance of wireless signal technology in recent years, it has become possible to perform data transmission and reception between the rotating side and the fixed side, even without a direct wire connection.

However, in order to cause image capture or other operation on the rotating side, it is necessary to supply power to the rotating side, but there has been the problem that it is difficult to supply contactlessly power from the fixed side to the rotating side.

Therefore, conventionally, a plurality of light-emitting elements have been provided on the top of a disk-shaped rotating body and a plurality of light-receiving elements of a fixed body have been provided in positions of the fixed side facing the light-emitting elements, data has been transmitted and received contactlessly, and a rotating transformer is constituted between the rotating side and fixed side, whereby the contactless supply of power from the fixed side to the rotating side has been implemented (see for example Japanese Patent Laid-open No. 2002-75760).

However, in Japanese Patent Laid-open No. 2002-75760, as the data communication speed is increased it may not necessarily be possible to transmit all the data from the light-emitting element of the rotating body to the light-receiving element of the fixed body. That is, in Japanese Patent Laid-open No. 2002-75760, the light path from light-emitting elements is switched to other light-receiving elements such that the contactless light connection between light elements is not broken due to rotation of the rotating member. In this switching method, as the data communication speed is increased there are cases in which data is transmitted faster than the time for processing to switch the light path, so that the continuity of high-speed communication cannot be secured.

SUMMARY OF THE INVENTION

Therefore, the present invention was conceived in view of the above problem and an object thereof is to provide a contactless connector for securing the continuity of high-speed communication.

In order to achieve the above object, a contactless connector of this invention includes a rotation-side light element provided on a rotating body that rotates about a rotation axis, and a fixed-side light element provided on a fixed body, and performing contactless data transmission and reception between the rotation-side light element and the fixed-side light element, comprising a reflecting body, which reflects light emitted from the rotation-side light element or from the fixed-side light element, on the rotation axis; and wherein a light formed between the rotation-side light element and the fixed-side light element via the reflecting element is substantially orthogonal to the rotation axis; and, the light path is formed between the rotation-side light element and the fixed-side light element via the reflecting body such that light reflected from the reflecting body is received by the rotation-side light element or by the fixed-side light element. As a result, for example, regardless of the position at which the rotation-side light element is positioned due to rotation of the rotating body, light emitted from the rotation-side light element is reflected by the reflecting body and is always directed toward a particular fixed-side light element, so that the light path can be realized with no interruptions, and the continuity of communication can be secured.

Further, in the contactless connector according to the present invention, the rotation-side light element is provided on a disc face of the rotating body orthogonal to the rotation axis, and the fixed-side light element is provided on a plane of the fixed body substantially parallel to the disc face of the rotating body. As a result, for example, the optical path formed between the rotation-side light element and the fixed-side light element via the reflecting body is formed within a plane orthogonal to the rotation axis, and the continuity of communication within this plane is secured.

Further, in the contactless connector according to the present invention, the reflecting body rotates about the rotation axis and is configured such that a rotation speed or a rotation angle of the reflecting body is half a rotation speed or a rotation angle of the rotating body. As a result, for example, the reflecting face of the reflecting body rotates along the reflection center line which rotates about the rotation axis, so that even when the position of the rotation-side light element changes due to rotation of the rotating body, light is always directed to a specified fixed-side light element.

Further, the contactless connector according to the present invention further comprises a first gear which rotates about the rotation axis together with the rotating body, a second gear which moves in rotation about the first gear, and a connecting portion which connects the second gear with the reflecting body, wherein the gear ratio of the first gear and the second gear is set such that the speed of motion of the second gear is half of the rotation speed of the first gear. As a result, for example, the reflecting body can be caused to rotate at half the rotation speed of the rotating body.

Further, in the contactless connector according to the present invention, an elastic body is further provided on the rotating body, one end of the elastic body being connected in a first position on a rotating body that rotates together with the rotation of the rotating body and the other end of the elastic body being connected in a second position that does not rotate in accordance with the rotation of the rotating body, on the rotating body spatially linked by means of a magnetic force to the fixed body, and in that the reflecting body is provided such that the reflecting face of the reflecting body is positioned on a line that joins substantially the center of a line that joins the first and second positions, and the rotation axis. As a result, the reflective body is driven at a rotation angle that is half that of the rotating body, for example.

Further, the contactless connector according to the present invention further comprises a detection portion, which detects the rotation speed or the rotation angle of the rotating body, and a reflecting body driving portion, which causes the reflecting body to rotate at half of the rotation speed or to half of the rotation angle detected by the detection portion. By this means, for example, the reflecting member can be caused to rotate at one-half the rotation speed of the rotating member.

Further, in the contactless connector according to the present invention, a plurality of rotation-side light elements are provided at arbitrary positions on the disc face of the rotating body, and a plurality of fixed-side light elements are provided on the fixed body, and wherein the plurality of fixed-side light elements are provided on the fixed body such that, when the fixed-side light elements are positioned on the light path line segments of incidence and reflection of the reflecting body with the rotating-side light elements, the light paths are formed via the reflecting body with the rotation-side light elements. As a result, for example, through the plurality of rotation-side light elements and fixed-side light elements, a light path is formed without interruptions, and transmission and reception of multi-channel data can be performed contactlessly.

Further, in the contactless connector according to the present invention, rotation-side light-emitting elements and rotation-side light-receiving elements are provided intermixed at arbitrary positions on the disc face of the rotating body, fixed-side light-receiving elements, which receive light emitted by the rotation-side light-emitting elements, and fixed-side light-emitting elements, which emit light to the rotating-side light-receiving elements, are provided intermixed on the fixed body, and that the fixed-side light-receiving elements and fixed-side light-emitting elements are provided intermixed such that, when the fixed-side light-emitting elements or the fixed-side light-receiving elements are positioned on the light path line segment of incidence and reflection by the reflecting body with the rotation-side light-receiving elements or the rotation-side light-emitting elements, the light path is formed with the rotation-side light-emitting elements or with the rotation-side light-receiving elements, via the reflecting body. As a result, for example, the light-emitting elements and light-receiving elements are placed intermixed between the rotating body and the fixed body, so that data can be transmitted and received contactlessly over numerous channels, and with simultaneous bidirectionality.

Further, in the contactless connector according to the present invention, the rotation-side light elements and the fixed-side light elements, in a plane substantially orthogonal to the rotation axis, are placed in a plurality of states, substantially orthogonal to the rotation axis, on the rotating body and on the fixed body respectively, and that in each stage the light path is formed between the rotation-side light elements and the fixed-side light elements. As a result, for example, contactless data transmission and reception over multiple channels is possible.

Further, the contactless connector according to the present invention further comprises a switching unit, to which data received as encoded light by the rotation-side light elements is input, and which outputs the data to the requested output stage among a plurality of output stages. As a result, for example, input data can be caused to be output to the output port desired by the user.

Further, the contactless connector according to the present invention further comprises a rotating transformer, comprising a transformer core and a transformer winding provided at each of the rotating body and the fixed body. As a result, power can be caused to be supplied contactlessly between the rotating body and the fixed body.

Further, the contactless connector according to the present invention further comprises a blind mating function, wherein the rotating body and the fixed body are mutually joinable, and the light path is formed between the rotation-side light element and the fixed-side light element, regardless of the position of the rotating body in the direction of rotation of the rotating body upon joining. As a result, a contactless connector having a function for blind mating of the rotating body and the fixed body can be provided.

Further, the contactless connector according to the present invention, the fixed-side light elements is placed at height different from that of the rotation-side light elements in the rotation axis direction, and in that the rotation-side light element is placed at an angle, relative to the plane face of the rotating body orthogonal to the rotation axis, such that the light path is formed with the fixed-side light element. As a result, for example, light emitted from rotation-side light elements can be received by fixed-side light elements via the reflecting body, without blockage of light paths by the rotation-side light elements themselves.

Further, the contactless connector according to the present invention, the reflecting body is of such a thickness that when the reflecting body is positioned between the rotation-side light element and the fixed-side light element due to rotation of the rotating body, the light path between the rotation-side light element and the fixed-side light element is not blocked, and which moreover has a mirror surfaces on both. As a result, the fixed-side light elements can receive light emitted from the rotating-side optical elements without blockage by the reflecting body.

Further, the contactless connector according to the present invention, the rotation-side light elements and the fixed-side light elements comprise optical fibers, and the light path is formed between the optical fibers. As a result, for example, high-speed data transmission and reception over multiple channels can be performed contactlessly.

A contactless connector of this invention comprises a reflecting body on the rotation axis of a rotating body, and is configured such that a light path is always formed between a rotation-side light element on the rotating body and a fixed-side light element on a fixed body, so that a contactless connector which secures the continuity of high-speed communication can be provided.

BRIEF DESCRIPTION OF THE DRAWINGS

FIG. 4 is a drawing to explain the light path formed by the reflecting body;

FIG. 13A is a top view of an elastic body drive device; and

FIG. 13B is a cross-sectional view of the elastic body drive device.

DESCRIPTION OF THE PREFERRED EMBODIMENTS

Preferred embodiments of the present invention will be described hereinbelow with reference to the drawings.

Figure 1:
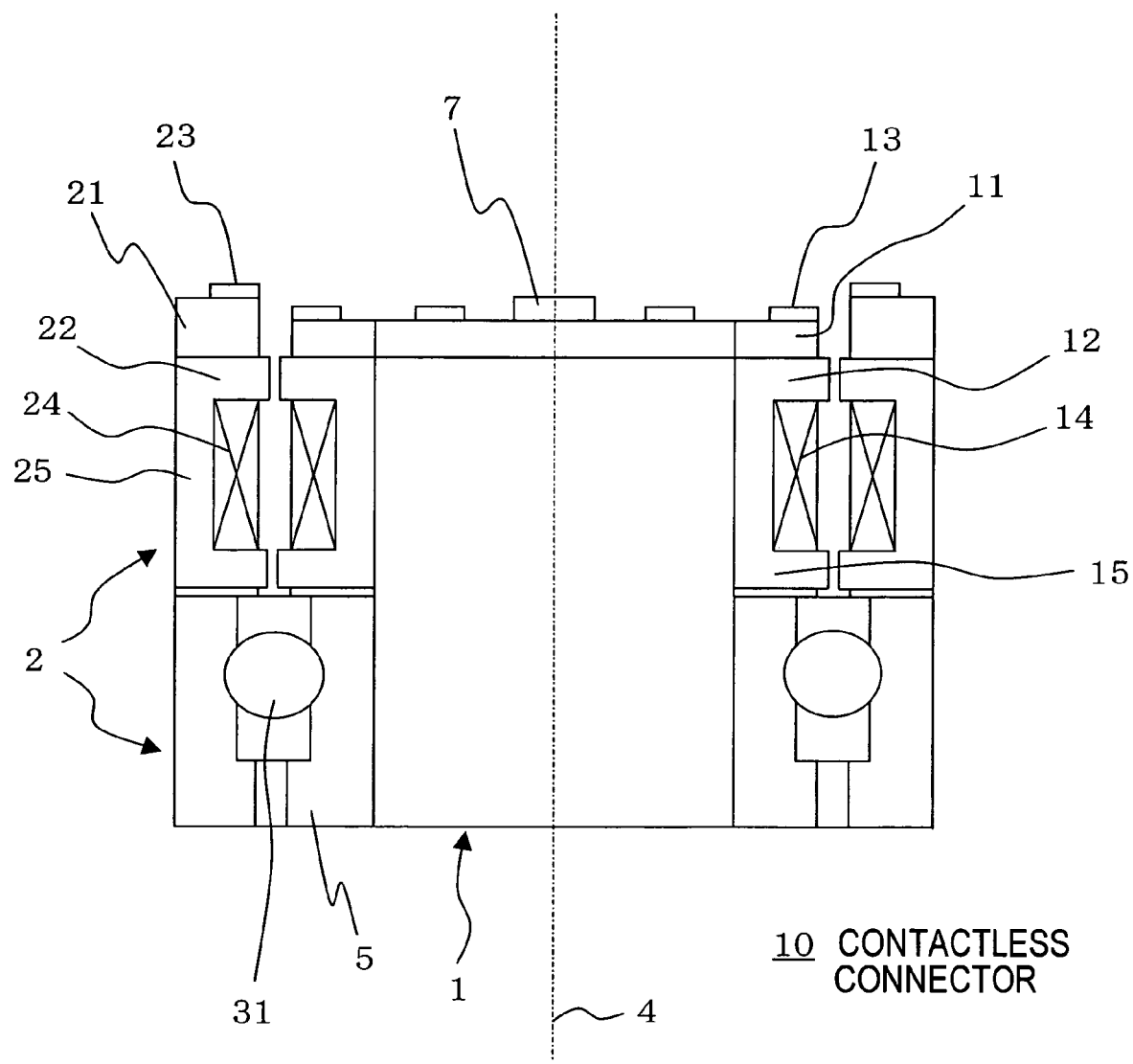
FIG. 1 is a cross-sectional view of a contactless connector to which the present invention is applied.

FIG. 1 is an example of a contactless connector 10 to which this invention is applied, showing the cross-sectional view in a plane containing the rotation axis 4. As shown in FIG. 1, the contactless connector 10 principally comprises the rotating body 1 and fixed body 2. The rotating body 1 is configured to enable rotation about the rotation axis 4. The fixed body 2 is placed and fixed in the vicinity of the rotating body 1.

The rotating body 1 comprises a rotating-side electric circuit portion 11, a rotation-side holding portion 12, a rotation-side optical element 13, a rotating-side transformer winding 14, a rotating-side transformer core 15, and a reflecting body 7.

The rotation-side electrical circuit portion 11 is provided on the upper portion of the rotating body 1, and performs various data processing. For example, when a camera for image pickup is mounted on the rotating body 1, a image signal and similar from the camera is inputted to the rotation-side electric circuit portion 11, and an electric signal is outputted causing the rotating-side optical element 13 to emit light.

The rotation-side holding portion 12 is positioned on the lower portion of the rotation-side electrical circuit portion 11, and holds the rotation-side electrical circuit portion 11.

The rotation-side light element 13 is positioned on the disc face of the rotating body 1, orthogonal to the rotation axis 4. This rotation-side light element 13 emits light according to electric signal from the rotation-side electric circuit portion 11, to transmit data contactlessly to a fixed-side light element 23 via the reflecting body 7. The rotation-side light element 13 also receives light which encodes data from the fixed-side light element 23 via the reflecting member 7, and outputs the data to the rotation-side electric circuit portion 11.

The rotating-side transformer winding 14 is on the lower portion of the rotating-side holding portion 12, and is positioned in a depression on the outside perimeter of the rotating body 1. Power is supplied from the fixed body 2 through electromagnetic inductive action, and power can be supplied to each portion of the rotating body 1 by this rotating-side transformer winding 14.

The rotating-side transformer core 15 is formed so as to enclose the rotating-side transformer winding 14, and has a U-shaped cross-section. The rotating-side transformer core 15 houses the rotating-side transformer winding 14 in the depression thereof, and forms a rotating transformer with the fixed body 2. The above-described rotation-side holding portion 12 is a portion of this rotating-side transformer core 15.

The reflecting body 7 is positioned on the rotation axis of the rotating body 1, and is configured to be rotatable about the rotation axis 4. This reflecting body 7 reflects light emitted by each of the optical elements 13, 23. Hence the reflecting surfaces of the reflecting body 7 are for example mirrors, and comprise a material with high reflectivity. In this embodiment, the reflecting body 7 is a plane mirror.

Next, the fixed body 2 is explained. As shown in FIG. 1, the fixed body 2 comprises a fixed-side electric circuit portion 21, a fixed-side holding portion 22, the fixed-side light element 23, a fixed-side transformer winding 24, and a fixed-side transformer core 25.

The fixed-side electric circuit portion 21 is provided in the upper portion of the fixed body 2. The fixed-side electric circuit portion 21 is connected to the fixed-side light element 23, and processes data encoded as light from the fixed-side light element 23 and outputs the processed data to an external apparatus connected to the fixed body 2. The fixed-side electric circuit portion 21 also outputs data input from the external apparatus to the fixed-side optical element 23.

The fixed-side holding portion 22 is positioned in the lower portion of the fixed-side electric circuit portion 21, and holds the fixed-side electric circuit portion 21.

The fixed-side optical element 23 is positioned on the plane face of the fixed body 2, substantially parallel to the disc face of the rotating body 1 on which is placed the rotation-side optical element 13. The fixed-side light element 23 receives contactlessly light emitted from the rotation-side light element 13 via the reflecting body 7, and outputs the data encoded in the light received to the fixed-side electric circuit portion 21. The fixed-side light element 23 emits light based on data from the fixed-side electric circuit portion 21, and transmits data to the rotating-side light element 13 via the reflecting body 7. As shown in FIG. 1, a light path is formed, in a direction substantially orthogonal to the rotation axis 4, between the fixed-side light element 23 and the rotating-side light element 13.

The fixed-side transformer winding 24 is in a position corresponding to the rotating-side transformer winding 14, and is positioned on the inner periphery side of the fixed body 2. The fixed-side transformer winding 24 supplies power from the external apparatus connected to the fixed member 2.

The fixed-side transformer core 25 is formed so as to enclose the fixed-side transformer winding 24, and has a U-shaped cross-section. The fixed-side transformer core 25 houses the rotating-side transformer winding 24 in the depression thereof, and forms a rotating transformer with the rotating body 1. The fixed-side holding portion 22 is a portion of this fixed-side transformer core 25.

Further, this contactless connector 10 comprises a rolling element 31 which smoothes the rotation action of the rotating body 1, and which positions the rotating body 1 relative to the fixed body 2. The rolling element 31 is positioned in the gap between the rotating body 1 and the fixed body 2. In order to render smooth the rolling action of this rolling element 31, the rotating body 1 and the fixed body 2 respectively comprise an inner ring and an outer ring. A bearing 5 is formed from the rolling element 31, the inner ring, and the outer ring.

When smoothing of the rotating action of the rotating body 1, positioning and similar are unnecessary, the rolling element 31 can be omitted.

Figure 2:
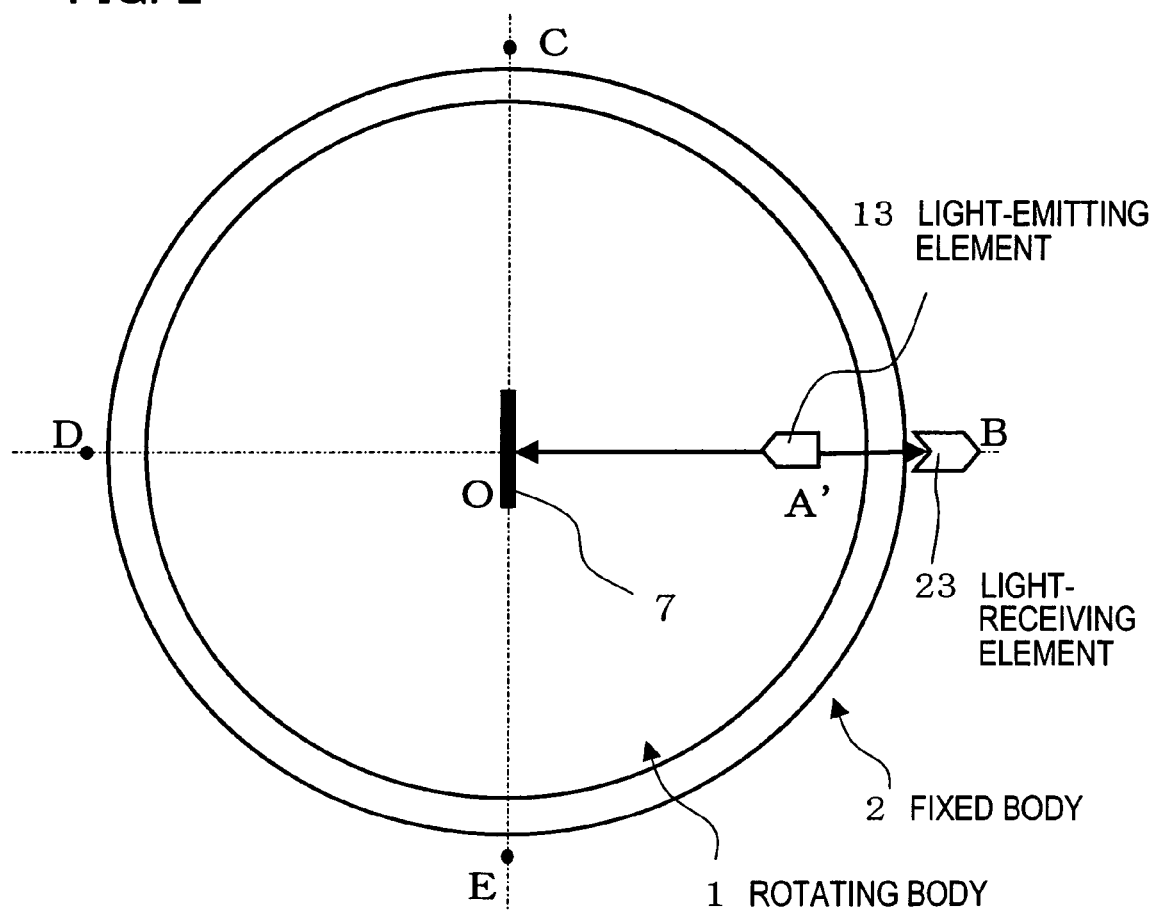
FIG. 2 is a drawing to explain the light path formed by the reflecting body.

Next, the light path formed between the rotation-side light element 13 and the fixed-side light element 23 is explained. FIG. 2 is one example, and is a top view of the contactless connector 10. The rotation-side light element 13 is a light-emitting element, and the fixed-side light element 23 is a light-receiving element; the reflecting body 7 rotates about the rotation center O, which is the intersection of the rotation axis 4 and the rotating body 1.

Figure 5A:
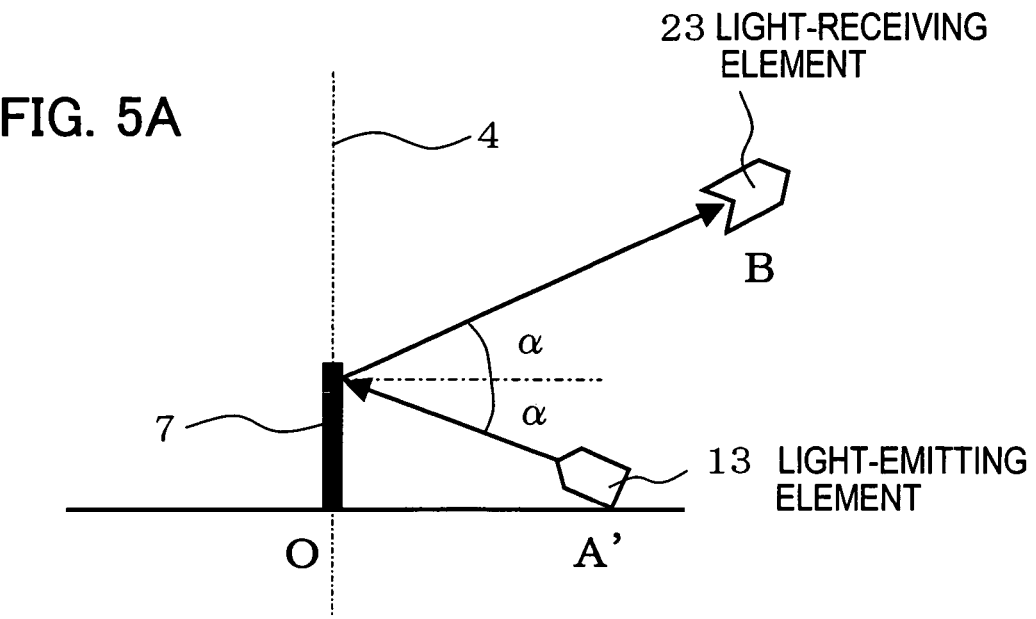
FIGS. 5A and 5B are drawings to explain the light path formed by the reflecting body.

As shown in the drawing, a case is considered in which the rotation-side light-emitting element 13 and the fixed-side light-receiving element 23 are positioned on a straight line facing the rotation center O, and the planar portion of the reflecting body 7 is on the line segment CE. In this case, when the rotation-side light-emitting element 13 emits light toward the reflecting body 7, the light is reflected at the reflecting body 7 and directed toward the fixed-side light element 23. However, the light path of the reflected light is blocked by the rotation-side light-emitting element 13. Hence as shown in FIG. 5(A), the fixed-side light-receiving element 23 is mounted at a position higher than the rotation-side light-emitting element 13. FIG. 5(A) is, similarly to FIG. 1, a side view of the contactless connector 10. The rotation-side light-emitting element 13 is provided at a mounting angle α with respect to the bottom of the rotating body 1, to enable light reception by the fixed-side light-receiving element 23 of different height. By this means, light reflected by the reflecting body 7 can pass over the rotation-side light-emitting element 13 and can be received by the fixed-side light-receiving element 23 without blockage of the light path.

Figure 3:
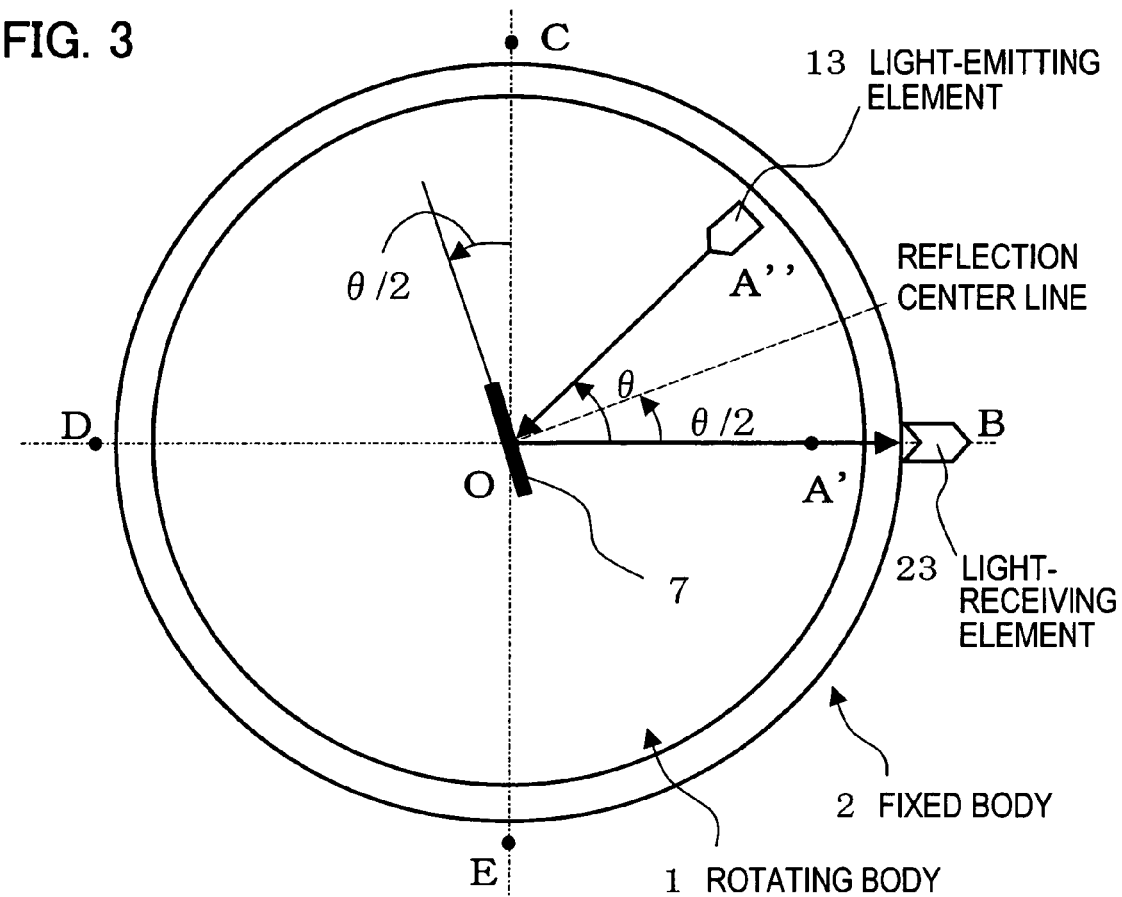
FIG. 3 is a drawing to explain the light path formed by the reflecting body.

Next, as shown in FIG. 3, a case in which the rotating body 1 has rotated by a prescribed angle θ is considered. In this case, the rotation-side light-emitting element 13 moves from position A' to position A".

In general, when incident light is reflected by a mirror or other reflecting surface, the angle made by the reflection center line orthogonal to the reflecting surface and the incident light is equal to the angle made by the reflection center line and the reflected light. In the example of FIG. 3, the angle made by the incident light from the light-emitting element 13 and the reflection center line (θ/2) is equal to the angle made by the reflection center line and the reflected light (θ/2).

On the other hand, as the rotating-side optical element 13 moves the reflection center line moves in rotation about the rotation center O. If the reflecting surface of the reflecting body 7 moves along this moving rotation center line, the angles made by the incident light and by the reflected light with the reflection center line are both θ/2, and so light emitted from the rotation-side optical element 13 is always reflected by the reflecting body 7 and directed toward the specific fixed-side light element 23.

Hence if the rotation speed of the reflecting body 7 is made one-half the rotation speed of the rotating body 1, light emitted from the rotation-side light element 13 is always directed toward the fixed-side light-receiving element 23.

That is, the rotation-side optical element 13 and fixed-side optical element 23 are provided such that light emitted from the rotation-side optical element 13 is reflected by the reflecting body 7, and when the fixed-side light element 23 is positioned on this light path line segment, a light path is formed between the light-emitting element 13 and the light-receiving element 23, via the reflecting body 7. Subsequently, if the rotation speed of the reflecting body 7 is half the rotation speed of the rotating body 1, then because the reflecting surface of the reflecting body 7 rotates about the rotation axis 4, a light path is always formed with the fixed light-receiving element 23 in a specific position, no matter what the position of the rotating-side light-emitting element 13 resulting from rotation of the rotating body 1.

As shown in FIG. 3, when the rotating-side light element 13 is positioned at position A" as a result of rotation of the rotating body 1, the reflection center line is positioned at θ/2, and so light emitted from the rotation-side light-emitting element 13 is reflected by the reflecting body 7 and can be received by the fixed-side light-receiving element 23.

When the rotating body 1 has rotated 90° (θ=90°), the reflecting body 7 has rotated 45°, and the reflection center line is positioned at 45°. At this time, the rotating-side light-emitting element 13 is positioned on the line segment CO, and light from the light-emitting element 13 which is reflected by the reflecting body 7 is directed toward the light-receiving element 23 at position B.

Figure 5B:
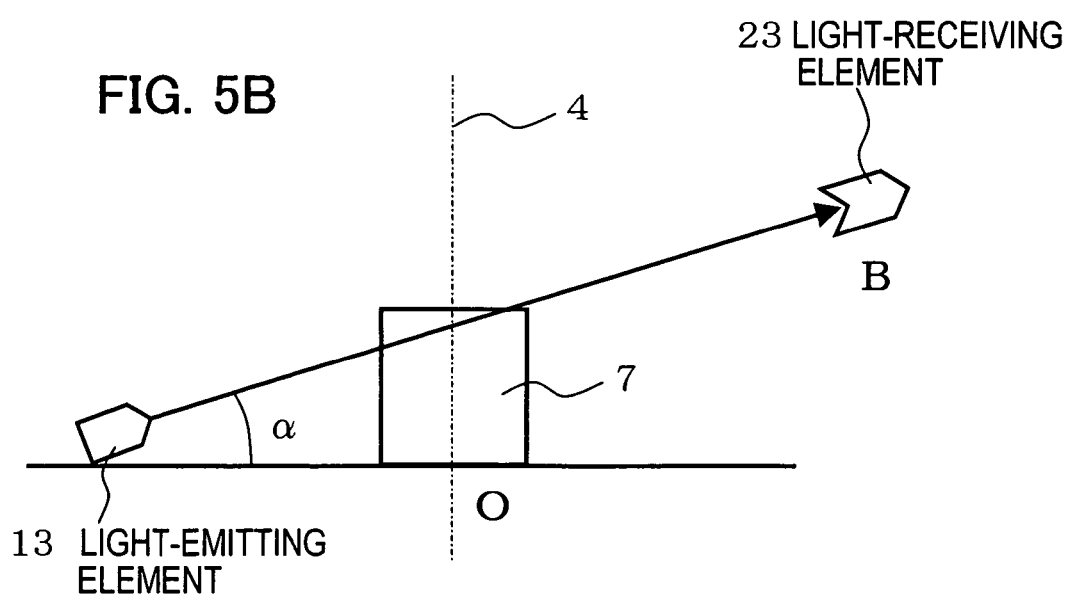

Next, a case is considered in which, as shown in FIG. 4, the rotating body 1 has rotated 180° (θ=180°). The reflection center line is positioned at the line segment CO (θ/2=90°), and the light path from the rotating-side light-emitting element 13 is directed through the reflecting body 7 to the fixed-side light-receiving element 23 at position B. In this case, the reflecting surface of the reflecting body 7 and the optical path from the light-emitting element 13 are parallel. As a result, light is not reflected by the reflecting body 7, and instead the light path is blocked by the reflecting body 7. Hence as shown in FIG. 5(B), the reflecting body 7 should be made thin so as not to block the light path from the light-emitting element 13 toward the light-receiving element 23.

Figure 6:
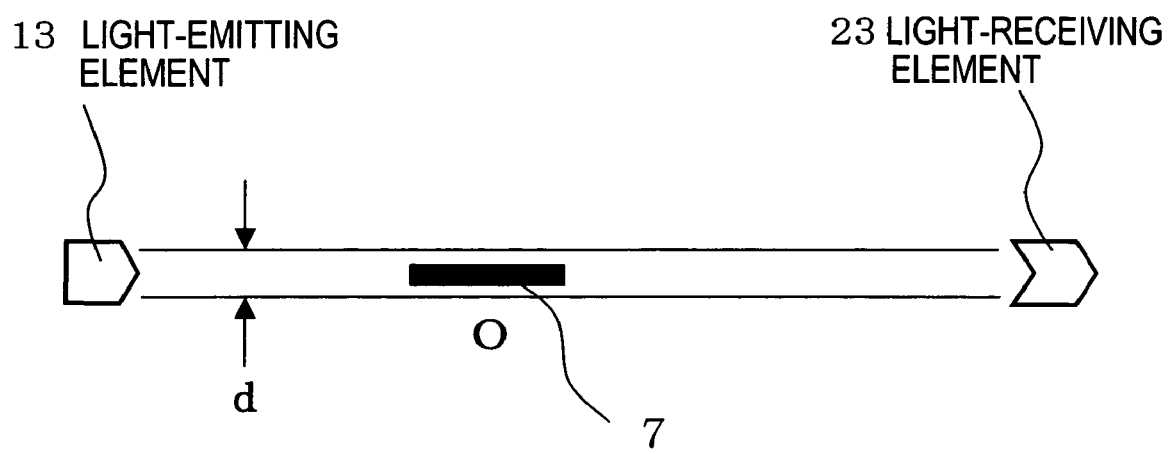
FIG. 6 is a drawing to explain the light path formed by the reflecting body.

As shown in FIG. 6, light emitted from the light-emitting element 13 has a certain width d. By designing the reflecting body 7 to be thinner than this width d, the light path is not blocked by the reflecting body 7 even when θ=180°, and light from the light-emitting element 13 can be received by the light-receiving element 23.

Next, returning to FIG. 3, when the rotating body 1 has rotated to 270° (θ=270°), the reflecting body 7 is rotated to 135° (θ/2), and the reflection center line is positioned at 135°. The rotation-side light element 13 is positioned on the line segment EO, and light emitted from the rotation-side light-emitting element 13 is directed toward the fixed-side light-receiving element 23 at position B.

Hence no matter what the position of the rotation-side light element 13 as a result of rotation of the rotating body 1, a light path is always formed with the fixed-side light-receiving element 23 at a specified position. Therefore the light path is formed without interruption between the rotation-side light element 13 and the fixed-side light element 23, and continuity of communication is secured. From the reversible property of light, similar behavior is obtained when the rotation-side light element 13 is a light-receiving element and the fixed-side light element 23 is a light-emitting element.

Next, a case is explained, referring to FIG. 7, in which a plurality of light-emitting elements 13 are provided on the rotating body 1, and a plurality of light-receiving elements 23 corresponding thereto are provided on the fixed body 2. In the example of FIG. 7, the rotation-side light-emitting elements 13 and the fixed-side light-receiving elements 23 are positioned at the vertex positions of regular hexagons.

In this example also, each of the rotation-side light elements 13 and fixed-side light elements 23 are provided such that light emitted from a rotation-side light element 13 is reflected by the reflecting body 7, and when a fixed-side light element 23 is positioned on the light path line segment, an optical path is formed between the rotating-side light element 13 and the fixed-side light element 23, via the reflecting body 7.

Figure 7A:
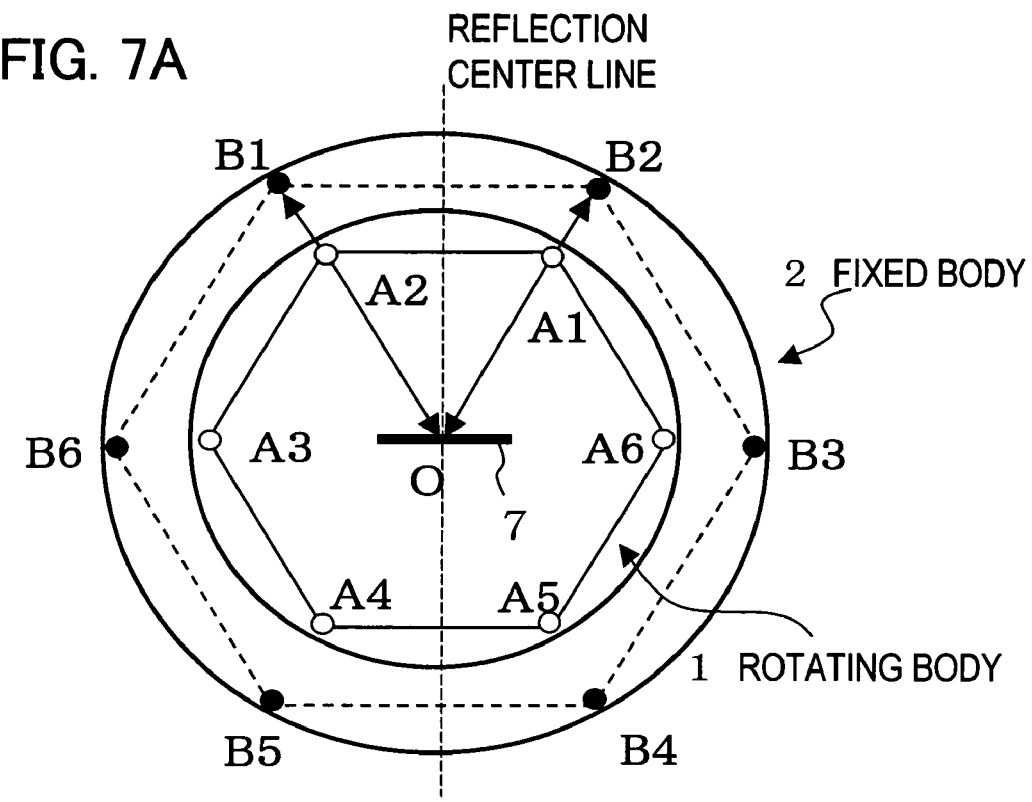
FIG. 7 is a drawing to explain the light paths formed by a plurality of optical elements.

A light path is considered for the positions in FIG. 7(A). The reflecting surface of the reflecting body 7 is positioned parallel to the line segment connecting B3 and B6. In this case, the reflection center line is positioned as shown in the drawing. Hence light emitted from the rotation-side light-emitting element A1 is reflected by the reflecting body 7 and directed toward the fixed-side light-receiving element B1. At this time, the light path to the fixed-side light-receiving element B1 is blocked by the rotation-side light-emitting element A2, but as shown in FIG. 5(A), the rotation-side light-emitting element A1 is provided at a mounting angle α with respect to the bottom of the rotating body 1, so that the light path passes over the rotation-side light-emitting element A2 and is directed to the fixed-side light-receiving element B1. A light path is also formed between the rotation-side light-emitting element A2 and the corresponding fixed-side light-receiving element B2. Further, as described above, because the thickness of the reflecting body 7 is such as not to block a light path, a light path is also formed from the rotation-side light-emitting element A3 toward the fixed-side light-receiving element B3. Because both sides of the reflecting body 7 are reflecting surface, the case is entirely the same for each of the other light-emitting elements A4 to A6.

Figure 7B:
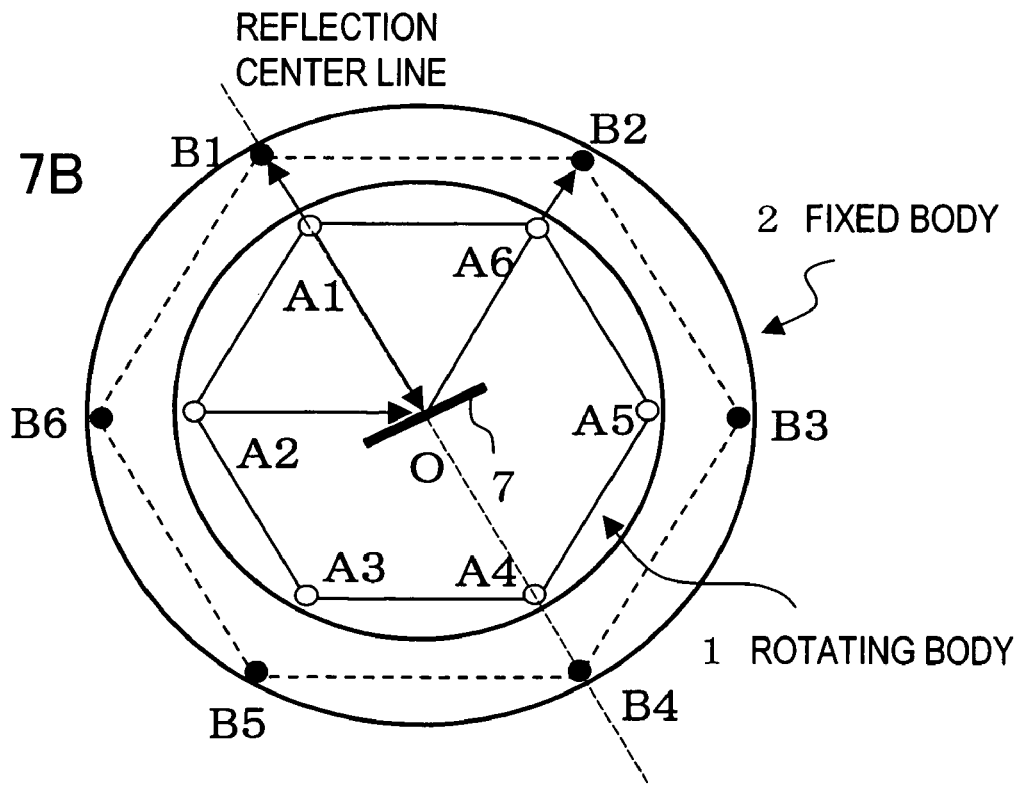

Here, a case is considered in which the rotating body 1 has rotated 60° counterclockwise, as in of FIG. 7(B). Each of the light elements A1 through A6 also moves through 60°. At this time, the reflecting body 1 has a rotation speed only half that of the rotating body 7, and so rotates through 30°. Hence the reflection center line is positioned as shown in the figure. The rotation-side light-emitting element A1 forms a light path directed toward the fixed-side light-receiving element B1, and the rotation-side light-emitting element A2 forms a light path directed toward the fixed-side light-receiving element B2. Because both surfaces of the reflecting body 7 are reflecting surfaces, the case is similar for all the other light-emitting elements A3 to A6.

Even when a plurality of rotation-side light-emitting elements 13 and fixed-side light-receiving elements 23 are placed in this way, the light paths can always be formed between each of the rotation-side light-emitting elements 13 and the corresponding fixed-side light-receiving elements 23. Hence even when there exist a plurality of rotation-side light elements 13 and fixed-side light elements 23, the lights paths are formed between each of the pairs of elements 13, 23 without interruption, and communication continuity can be secured. Through communication by the plurality of optical elements 13, 23, multichannel data transmission and reception can be performed by the contactless connector 10.

In the example shown in FIG. 7, elements 13, 23 were placed in 60° intervals in order to facilitate the explanation; but intervals are not limited to 60°, and arbitrary positions may be chosen. This is because if the rotation speed of the reflecting body 7 is made half the rotation speed of the rotating body 1, then the light paths can always be formed between the rotation-side light-emitting elements 13 and the corresponding fixed-side light-receiving elements 23. At this time, the initial angular position of the reflecting body 7 may be set so that the orientation of the reflecting body 7 is such that the light paths are formed between the rotation-side light-emitting elements 13 and the fixed-side light-receiving elements 23.

In the example shown in FIG. 7, all of the rotation-side optical elements 13 are set at positions a constant distance from the rotation center O, but positions at arbitrary distances may be used. In this case the rotating body 1 should be provided with each of the mounting angles α set so that each of the rotating-side light elements 13 forms a light path with the corresponding fixed-side light element 23.

Further, in the example shown in FIG. 7 the rotation-side light elements 13 are light-emitting elements, and the fixed-side light elements 23 are light-receiving elements; but due to the reversible property of light, entirely similar light paths are formed even if the rotation-side light elements 13 are light-receiving elements and the fixed-side light elements 23 are light-emitting elements. By this means, simultaneous bidirectional data transmission and reception can be performed using the contactless connector 10.

The case is similar for intermixed placement, in which a portion of a plurality of rotation-side light elements 13 are light-emitting elements, and the remainder are light-receiving elements. For example, if the rotation-side light element A1 is a light-emitting element and the light element A2 is a light-receiving element, then intermixed placement is adopted in which the fixed-side light element B1 is a light-receiving element and light element B2 is a light-emitting element.

Figure 8:
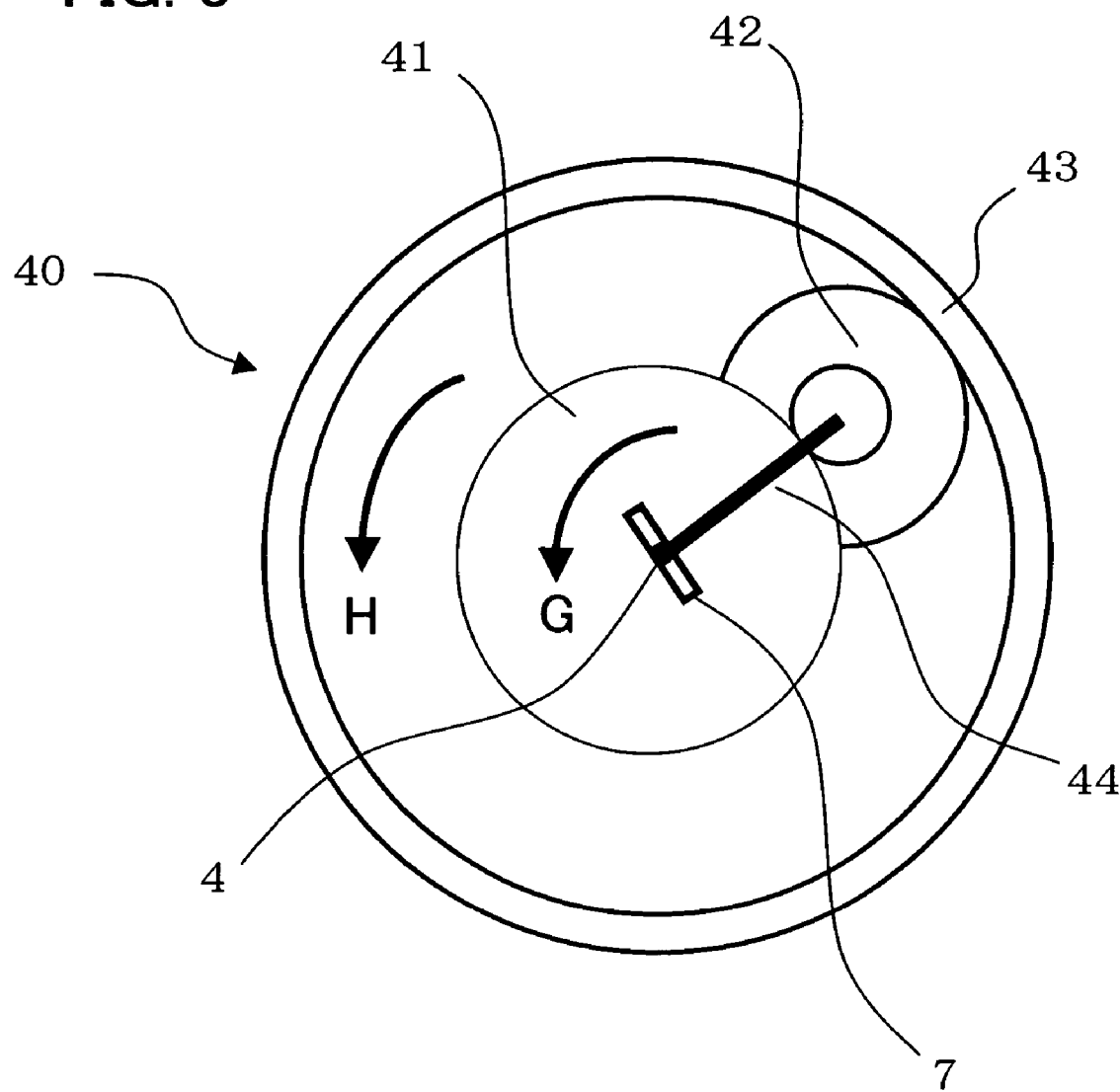
FIG. 8 shows the configuration of a planetary-gear variable speed device.
Figure 9:
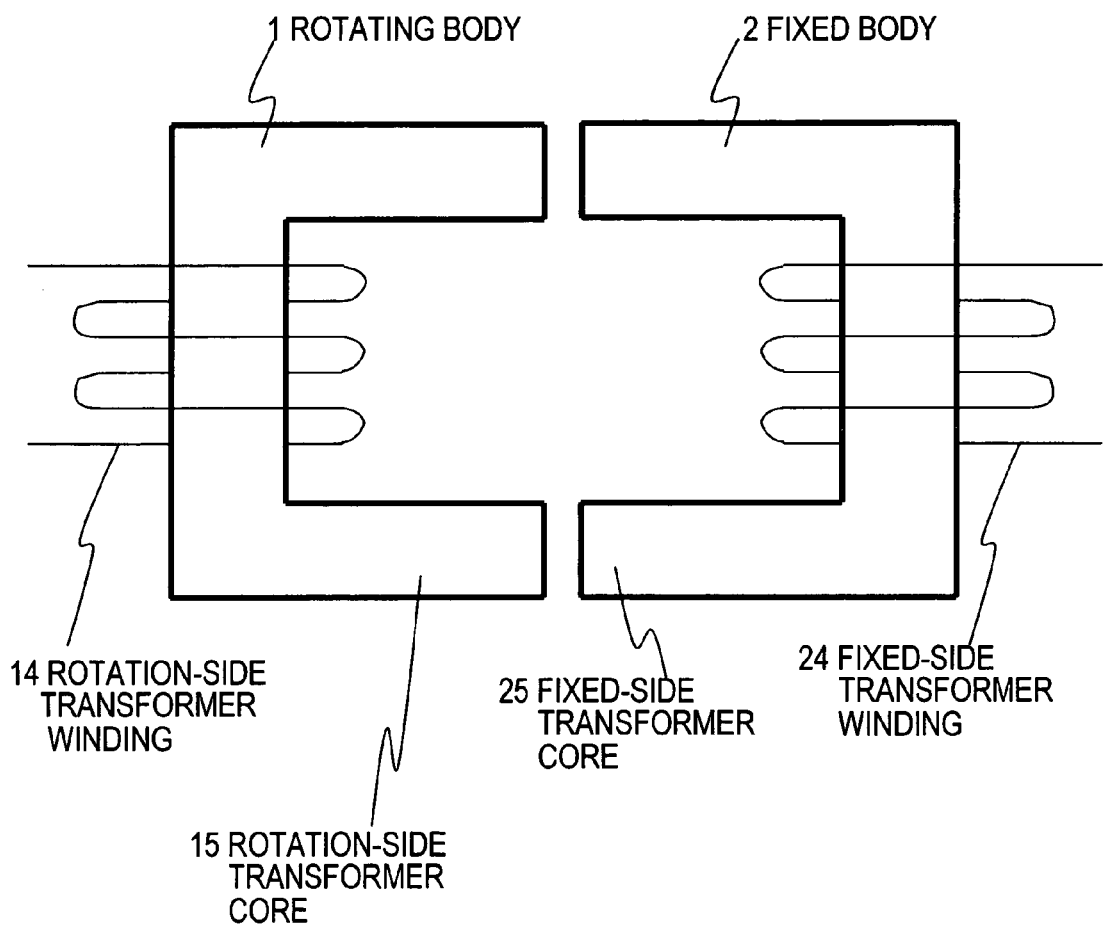
FIG. 9 is a drawing to explain the contactless supply of power.

Next, rotation control is explained in which the rotation speed of the reflecting body 7 is made half the rotation speed of the rotating body 1. FIG. 8 shows, as one example, a planetary-gear variable-speed device 40. This planetary-gear variable-speed device 40 is for example provided within the rotating body 1.

The planetary-gear variable-speed device 40 comprises a sun gear 41, a planetary gear 42, an internal gear 43, and an arm 44. The sun gear 41 is provided at the center of the rotating body 1. Because the rotation axis of this sun gear 41 is made coincident with the rotation axis of the main device causing the rotating body 1 to rotate, the sun gear 41 rotates about the rotation axis 4 together with the rotating body 1.

On the other hand, the planetary gear 42 is placed on the outside of the sun gear 41 and rotates accompanying rotation of the sun gear 41, as well as moving between the sun gear 41 and the internal gear 43. The planetary gear 42 has a two-stage construction, in which a gear meshing with the sun gear 41 (a fixed gear) is positioned on top of a gear which meshes with the internal gear 43. The arm 44 is placed on a line segment connecting the center of the planetary gear 42 and the center of the reflecting body 7 (the position on the rotation axis 4).

Here, if the sun gear 41 rotates in the direction G due to rotation of the main unit device, then the planetary gear 42 rotates in the direction H. Accompanying this motion, the reflecting body 7 also rotates in the direction H. By choosing a prescribed value for the ratio of the number of teeth of the sun gear 41 to the number of teeth of the planetary gear 42, the movement speed of the planetary gear 42 is made half the rotation speed of the sun gear 41. By this means, the reflecting body 7 rotates about the rotation axis 4 at half the rotation speed of the rotating body 1.

Another example of control to rotate the reflecting body 7 at half the rotation speed or rotation angle will be described next.

FIG. 13A is a top view of the contactless connector 10 and FIG. 13B is a cross-sectional view of the contactless connector 10. As shown, the rotating body 1 comprises, in order starting from the side of the rotation axis 4, an inside wheel 532, a rolling element 533, an outside wheel 531, and a rotation-side magnet 541. The aforementioned bearing 5 is constituted by the inside wheel 532, rolling element 533, and outside wheel 531. Further, the fixed body 2 comprises a fixed-side magnet 542 in a position facing the rotation-side magnet 541.

Further, the rotating body 1 further comprises two elastic bodies 51 and 52. The two elastic bodies 51 and 52 both have substantially the same elastic characteristics. As shown in FIG. 13A and so forth, the two elastic bodies 51 and 52 are connected in series. Further, one end of the elastic body 51 is connected to the inside wheel 532 and one end of the elastic body 52 is connected to the outside wheel 531.

Meanwhile, the rotation-side magnet 541 and fixed-side magnet 542 are arranged facing each other. Therefore, the two magnets 541 and 542 are spatially linked by a magnetic force. Hence, even if the rotating body 1 rotates, the rotation-side magnet 541 does not rotate as a result of the fixed-side magnet 542 and the magnetic force thereof. In addition, because the outside wheel 531 is also integrally linked to the rotation-side magnet 541, the outside wheel 531 does not rotate either.

Spatially fixed bodies are constituted by the rotation-side magnet 541 and outside wheel 531.

That is, because one end of the elastic body 52 is connected to the spatially fixed bodies of the rotating body 1, the elastic body 52 does not rotate even though the rotating body 1 rotates. Meanwhile, because one end of the elastic body 51 is connected to the inside wheel 532, the elastic body 51 rotates together with the rotation of the rotating body 1. Further, an elastic body drive device 50 is constituted by the two elastic bodies 51 and 52.

Figure 14:
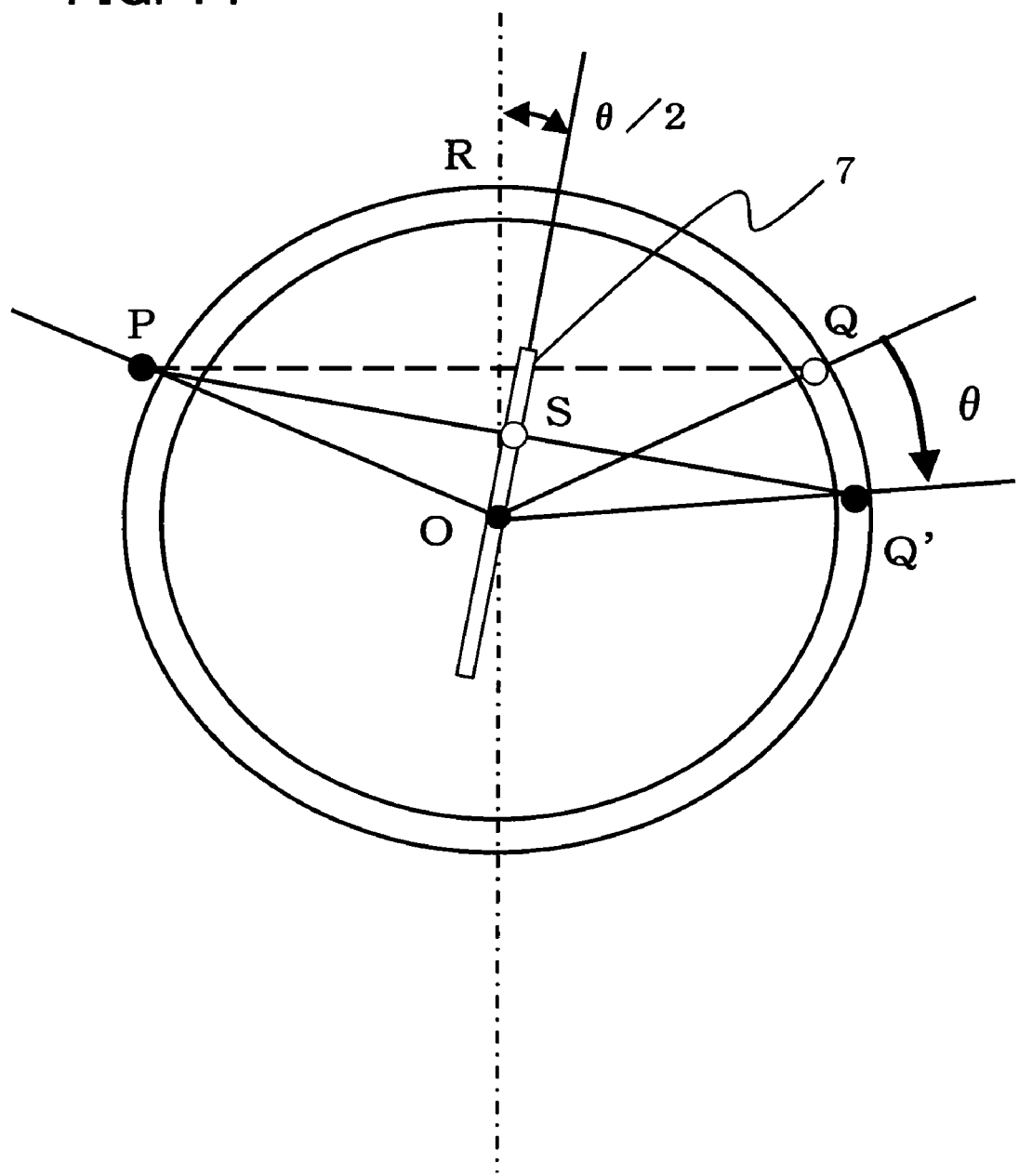
FIG. 14 serves to illustrate the operation of the elastic body drive device.

The operation of the elastic body drive device 50 will be described next. FIG. 14 serves to illustrate the operation of the elastic body drive device 50. The time when the rotating body 1 rotates through the rotation angle e after the two elastic bodies 51 and 52 are positioned on the line segment PQ is considered. In other words, the time when one end of the elastic body 51 moves from point Q to Q' is considered.

When the two elastic bodies 51 and 52 are extended by 'x' overall as a result of the rotation of rotating body 1, the elastic characteristics of the two elastic bodies 51 and 52 are substantially the same. Therefore, the elastic body 51 is extended by 'x/2' and the elastic body 52 is also extended by 'x/2'.

Here, when two triangles OPS and OQ'S are considered, the two triangles are the same shape. This is because line segment PS extends by 'x/2' and line segment SQ' is also extended by 'x/2'.

Further, when the rotating body 1 rotates about 0, the line segment PS is extended by 'x/2' and, therefore, the reflecting body 7 rotates through 'θ/2' from a position on the line segment OR. Therefore, the reflecting body 7 can be rotated through half the rotation angle of the rotating body 1.

Thus, one end of the elastic body 51 is connected in a position (points Q and Q') on the rotating body 1 that rotates together with the rotation of the rotating body 1, while the other end of the elastic body 52 is connected in a position (point P) that does not rotate in accordance with the rotation of the rotating body 1, on the rotating body 1 spatially linked by a magnetic force to the fixed body 2. The reflecting body 7 is provided such that the reflecting face of the reflecting body 7 is located on a line segment OR (line segment OS) that joins substantially the center of the line segment PQ (line segment PQ') and the rotation axis 4.

As shown in FIG. 13A and so forth, the rotating body 1 and fixed body 2 can also be constituted spaced apart in an example of the elastic body drive device 50. Accordingly, a light path can be constituted by a simple operation such as a mating operation, for example, that mates the rotating body 1 with the fixed body 2, whereby a contactless optical connector or optical outlet can be easily created.

Further, the elastic bodies 51 and 52 are actually constituted by means of a spring or rubber or the like. Further, there may be one rather than two elastic bodies 51 and 52 or the constitution may involve a plurality of three or more. In addition, one end of the elastic body 51 may be connected anywhere as long as same is in a position that rotates together with the rotating body 1 and one end of the elastic body 52 may be connected in any position as long as the elastic body 52 is above the spatially fixed bodies on the rotating body 1.

In order to cause the reflecting body 7 to rotate at half the rotation speed or the rotation angle, in addition to this planetary-gear variable-speed device 40, for example, a reflecting member driving device, for example a motor and so on, which causes the reflecting body 7 to rotate and a detection device 7 which detects the rotation speed and rotation angle of the rotating body 1 may be provided, with feedback control applied to the reflecting member driving device such that the rotation speed and the rotation angle of the reflecting member is half that of the rotating member based on the detection results of the detection device.

Next, the initial angular position of the reflecting body 7 is explained.

When employing the above-described planetary-gear variable-speed device 40, the reflecting body 7 is linked to the rotating body 1 through a series of gears, so that the positional relation of the reflecting body 7 with respect to the rotating body 1 does not change. That is, there is no need to set the initial position of the reflecting body 7. However, when employing a reflecting body driving device, if a brake mechanism or similar is installed, it may be necessary to set the initial position of the reflecting body 7. In this case, for example, if the initial angular position of the detection device which detects the rotation angle of the rotating body 1 is the position when the rotating-side light-emitting element 13 and fixed-side light-receiving element 23 are on a straight line directed toward the rotation center O of the reflecting body 7, then settings should be made by inputting half of this rotating angle as the initialization position for the reflecting body 7, and applying feedback control to the reflecting member driving device.

A contactless optical connector can be constituted as long as a structure is achieved in which only the reflecting body 7 is installed on the rotation axis 4 instead of installing the aforementioned reflecting body drive mechanism and rotation angle detection device and an optical path is constituted between the rotating body 1 and fixed body 2 by mating the fixed body 2 with the rotating body 1.

Further, a constitution with no reflecting body drive mechanism constitutes one usage form of a reflecting body drive system that is substantially the same as a state where the input of the reflecting body drive mechanism is zero (drive stoppage).

In addition, a constitution with no reflecting body drive mechanism constitutes one usage form of the elastic body drive device 50 that is substantially the same as a state where the elastic constant of the elastic body drive device 50 is very large (the reflecting body 7 barely moves).

Such constitutions make it possible to constitute a contactless optical connector that differs from that of an existing ferrule contact system.

A contactless supply of power from the fixed body 2 to the rotating body 1 will now be described by using FIG. 7. As explained above, the rotation-side transformer winding 14 is wound around the trunk part of the rotation-side transformer core 15 of the rotating body 1, and the fixed-side transformer winding 24 is wound around the trunk part of the fixed-side transformer core 25 of the fixed body 2. In this state, a magnetic field is produced in the periphery of the fixed-side transformer core 25 as a result of the supply current flowing from the main body apparatus to the fixed-side transformer winding 24. Through the rotating action of the rotating body 1, a magnetic circuit is formed when the rotation-side transformer core 15 is positioned at the position corresponding to the fixed-side transformer core 25 generating the magnetic field, and a current is generated (by the so-called law of electromagnetic induction) in the rotation-side transformer winding 14 wound around the trunk part of the rotation-side transformer core 15. As a result, power is supplied to each part of the rotating body 1, and the rotation-side electric circuit portion 11 is driven and the rotating-side light-emitting elements 13 emit light, for example.

Next, the blind mating function of the contactless connector 10 is explained. The blind mating function is a function by which, when assembling the contactless connector 10, if the rotating body 1 is inserted into and joined with the fixed body 2, the contactless connector 10 can be used regardless of the position in the rotation direction of the rotating body 1. In the case of a contactless connector 10 having such a blind mating function, there is no need for positioning of the rotating body 1, so that the bearing 5 comprising the rolling element 31 can be omitted.

For example, after joining the rotating body 1 with the fixed body 2, suppose that the rotating body 1 is joined in the position shown in FIG. 3. If at the time of design or at another time the position of the reflecting body 7 is determined such that, when the rotation-side light element 13 and the fixed-side light element 23 are positioned on a straight line toward the rotation center O, light reflected from the reflecting body 7 is directed toward the fixed-side light element 23, then the position after joining can be considered similarly to the position after rotation of the rotating body 1. That is, positioning of the rotating body 1 in the position shown in FIG. 3 after joining is equivalent to positioning in the position shown in FIG. 3 after the rotating body 1 has rotated. Hence regardless of the position of joining in the rotation direction of the rotating body 1, a light path is always formed with the fixed-side light element 23, so that by using this contactless connector 10, a blind mating function can be realized.

Figure 10:
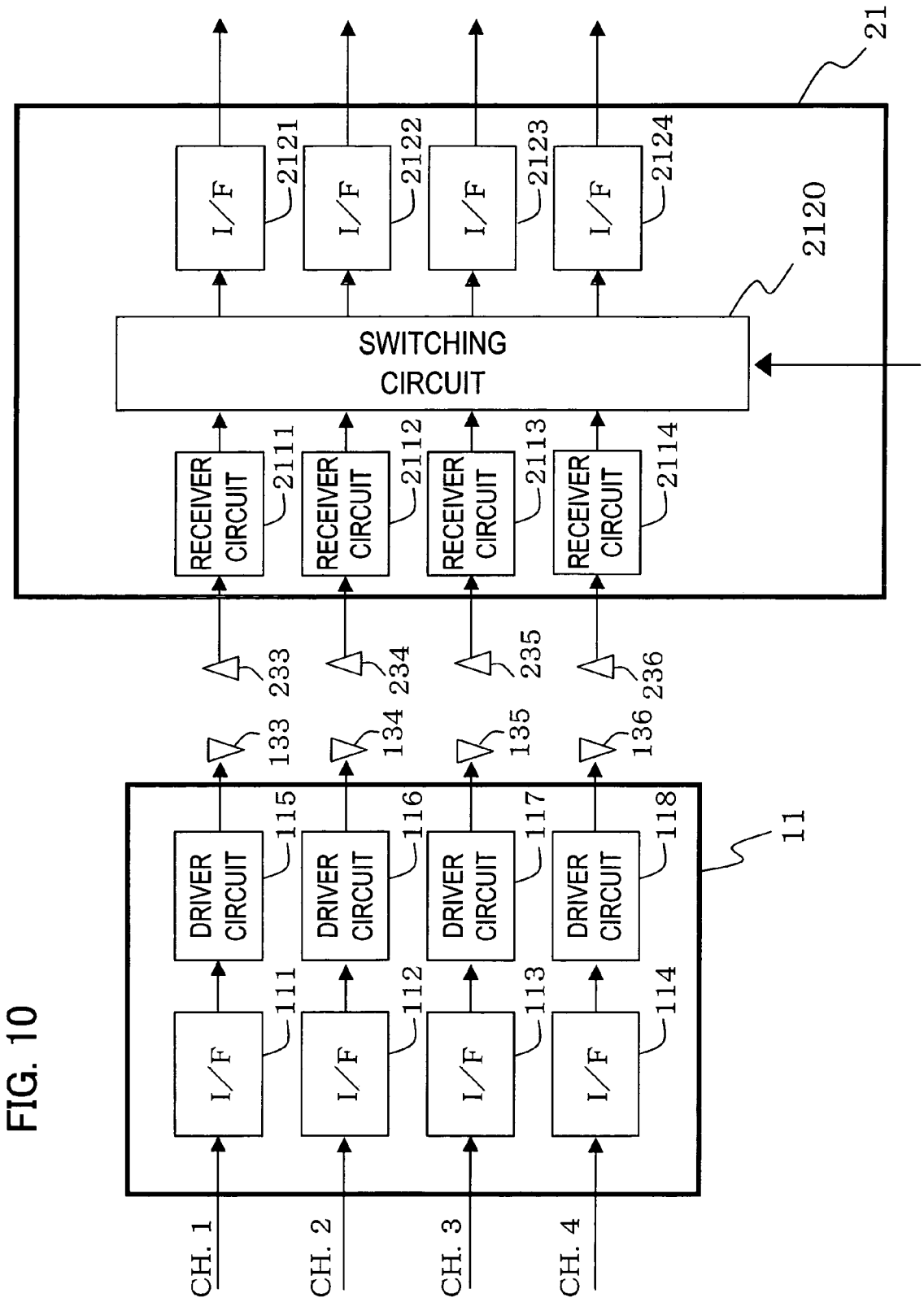
FIG. 10 shows the configuration of a rotating-side electrical circuit portion and a fixed-side electrical circuit portion.

Next, details of the rotating-side electric circuit portion 11 and fixed-side electric circuit portion 21 are explained using FIG. 10. In this example, of a case in which data is transmitted and received over four channels (CH 1 to CH 4), one channel's worth of data is transmitted and received using each of the rotation-side light elements 133 to 136 and corresponding fixed-side light elements 233 to 236.

The rotating-side electric circuit portion 11 comprises interface (I/F) circuits 111 to 114 to process data for each channel, and driving circuits 115 to 118. Data from the main body apparatus is input to the I/F circuits 111 to 114, and is converted into data which can be processed within the electric circuit portion 11. In the driving circuits 115 to 118 this data is converted into driving data, and based on this driving data, light is caused to be emitted from the rotation-side light-emitting elements 133 to 136.

The fixed-side electric circuit portion 21 comprises receiving circuits 2111 to 2114 and a switching circuit 2120, as well as I/F circuits 2121 to 2124. Data received encoded as light by prescribed fixed-side light-receiving elements 233 to 236 is converted in the receiving circuits 2111 to 2114 into data which can be processed within the electric circuit portion 21, and is output to the switching circuit 2120. In the switching circuit 2120, switching is performed in order to output the data received in each channel to the prescribed output stage. By this means, the data in the first channel is output from the I/F circuit 2122, the data in the second channel is output from the I/F circuit 2123, and similarly, data can be caused to be output from output stages desired by the user. Moreover, a switching control signal can be input to the switching circuit 2120 from an external device to cause switching to a desired output stage (a so-called multiplexer function).

Figure 11:
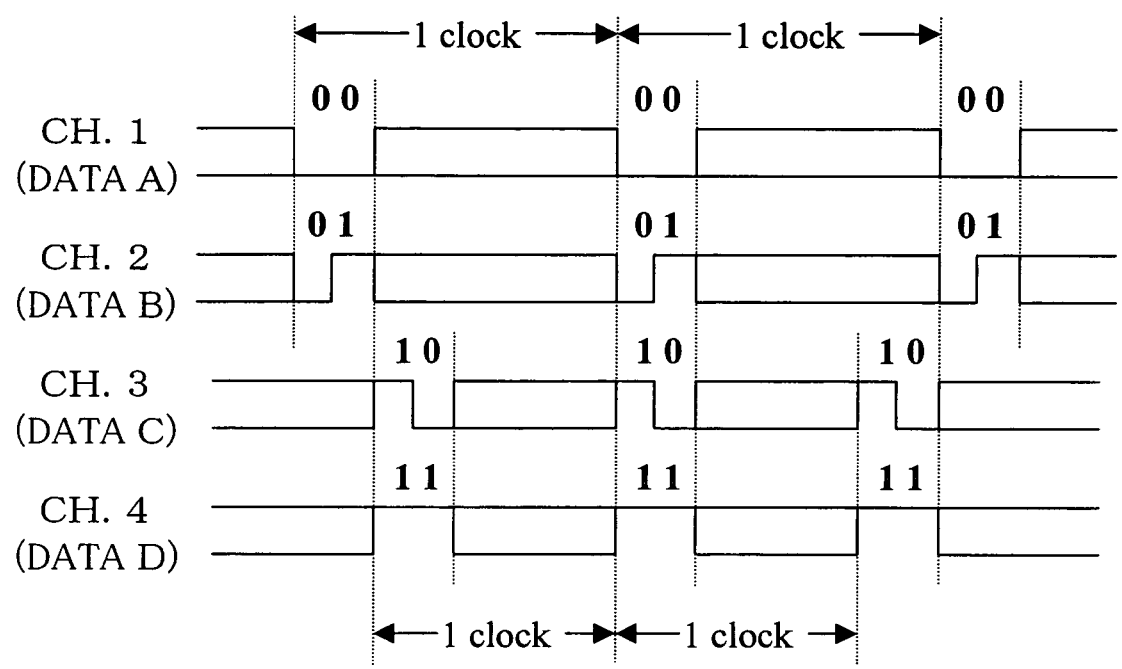
FIG. 11 shows an example of data to which is added channel identification code.

Further, as shown in FIG. 11, identification code may be added to data for each channel through processing by the main body apparatus, and this identification code may be used by the switching circuit 2120 to perform discrimination and switching. For example, upon discriminating "00" the data is output from I/F circuit 2124 as data in the first channel.

Such channel identification encoding may be performed by a data processing circuit of the main body apparatus, connected to the fixed body 2, or may be performed by the driving circuits 115 to 118 of the rotation-side electric circuit 11. Moreover, rather than adding channel identification code to all data of all channels, the code may be added to only some among the plurality of channels, to perform identification of individual channels (dedicated line use).

By thus adding identification code to data, data can be received over multiple channels at the fixed body 2, and the channel of a data item can be identified and the data output to a prescribed output stage, so that an automatic channel switching function can be realized in the contactless connector 10.

In the example shown in FIG. 10, the configuration of the electric circuit portions 11 and 21 are shown when the rotation-side light elements 133 to 136 are light-emitting elements and the fixed-side light elements 233 to 236 are light-receiving elements. Apart from this, the rotation-side light elements 133 to 136 may be light-receiving elements, with the fixed-side light elements 233 to 236 being light-emitting elements. In this case, the rotation-side electric circuit portion 11 comprises the receiving circuits 2111 to 2114, switching circuit 2120, and I/F circuits 2121 to 2124, while the fixed-side electric circuit portion 21 comprises the I/F circuits 111 to 114 and the driving circuits 115 to 118.

Figure 12:
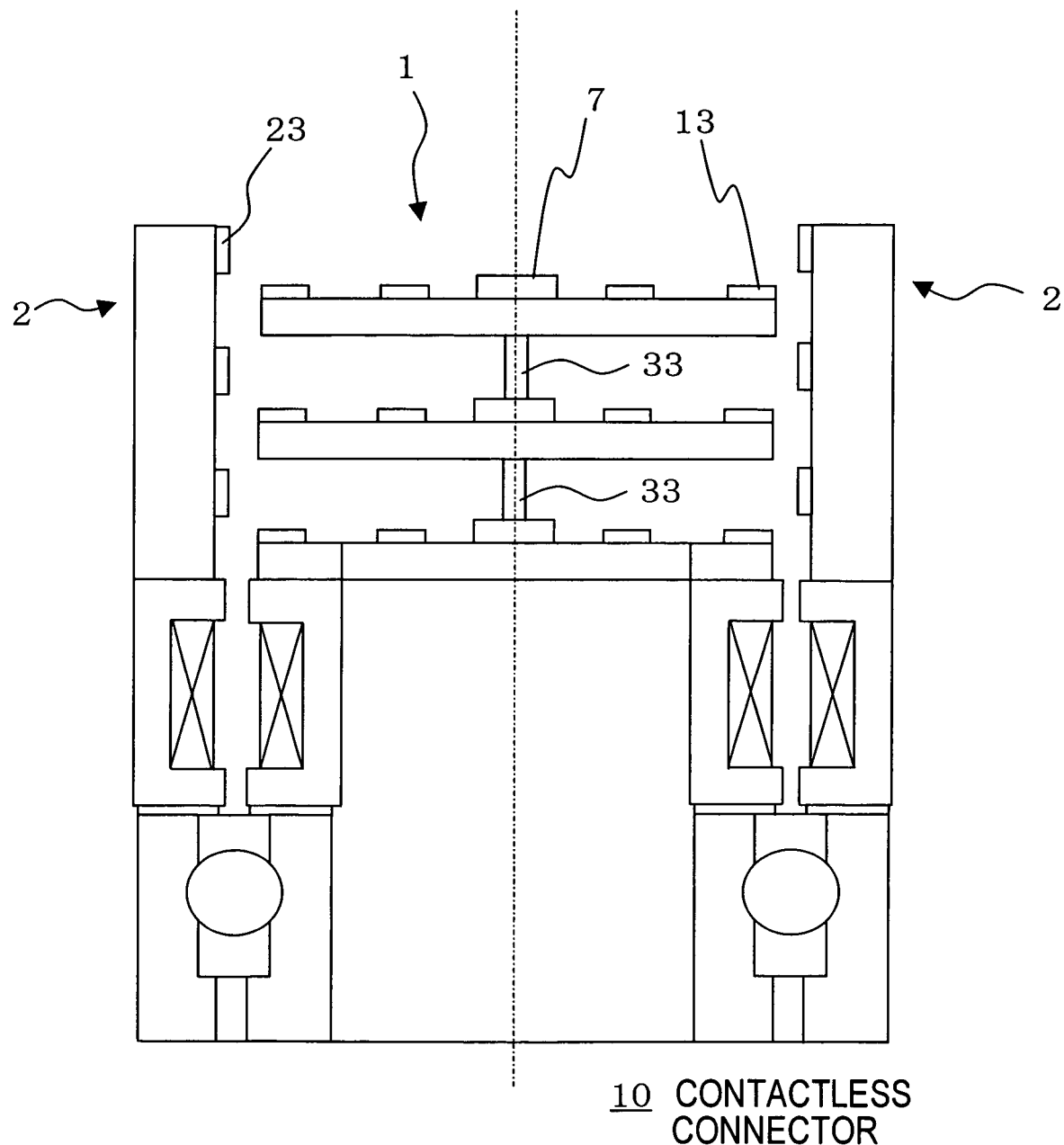
FIG. 12 shows an example of a contactless connector in which are placed a plurality of stages.

In the above, examples were explained in which the light paths are formed between rotation-side optical elements 13, fixed-side light elements 23, and the reflecting body 7. In addition, as shown in FIG. 12, rotation-side light elements 13 and fixed-side light elements 23 may be placed in a plurality of stages substantially parallel with the rotation axis 4. Through placement in a plurality of stages, data transmission and reception over a still greater number of channels is possible. In this case, fixed-side light elements 23 are provided on the side faces of the fixed body 2, to form light paths between fixed-side light elements 23 and rotation-side light elements 13 in each stage which, as explained above, are not interrupted. Further, in each stage a plurality of rotation-side light elements 13 and fixed-side light elements 23 may be placed, as described above, and light-emitting elements may be placed intermixed with light-receiving elements. The stages on the rotation side are connected through the shaft 33, and are mounted to enable rotation accompanying rotation of the rotating body 1.

The rotating-side optical elements 13 and fixed-side light elements 23 can be replaced with optical fiber, to form light paths without interruptions by means of the fixed-side optical fiber and rotation-side optical fiber.

What is claimed is:

1. A contactless connector including a rotation-side light element provided on a rotating body that rotates about a rotation axis, and a fixed-side light element provided on a fixed body, and performing contactless data transmission and reception between the rotation-side light element and the fixed-side light element, comprising:

a reflecting body, which reflects light emitted from the rotation-side light element or from the fixed-side light element, on the rotation axis, the reflecting body having a mirror surface on both faces;

wherein a light path formed between the rotation-side light element and the fixed-side light element via the reflecting body is substantially orthogonal to the rotation axis, the light path is formed between the rotation-side light element and the fixed-side light element via the reflecting body such that light reflected from the reflecting body is received by the rotation-side light element or by the fixed-side light element, and the reflecting body is of such a thickness that when the reflecting body is positioned between the rotation-side light element and the fixed-side light element due to rotation of the rotating body, the light path between the rotation-side light element and the fixed-side light element is not blocked.

2. The contactless connector according to claim 1, wherein the rotation-side light element is provided on a disc face of the rotating body orthogonal with the rotation axis, and the fixed-side light element is provided on a plane of the fixed body substantially parallel to the disc face of the rotating body.

3. The contactless connector according to claim 1, wherein the reflecting body rotates about the rotation axis, and is configured such that a rotation speed or a rotation angle of the reflecting body is half a rotation speed or a rotation angle of the rotating body.

4. The contactless connector according to claim 3, further comprising a first gear which rotates about the rotation axis together with the rotating body, a second gear which moves in rotation about the first gear, and a connecting portion which connects the second gear with the reflecting body, wherein the gear ratio of the first gear and the second gear is set such that the speed of motion of the second gear is half the rotation speed of the first gear.

5. The contactless connector according to claim 3, wherein an elastic body is further provided on the rotating body, one end of the elastic body being connected in a first position on a rotating body that rotates together with the rotation of the rotating body and the other end of the elastic body being connected in a second position that does not rotate in accordance with the rotation of the rotating body, on the rotating body spatially linked by means of a magnetic force to the fixed body; and
  the reflecting body is provided such that the reflecting face of the reflecting body is positioned on a line that joins substantially the center of a line that joins the first and second positions, and the rotation axis.

6. The contactless connector according to claim 3, further comprising a detection portion, which detects the rotation speed or the rotation angle of the rotating body, and a reflecting body driving portion, which causes the reflecting body to rotate at half of the rotation speed or to half of the rotation angle detected by the detection portion.

7. The contactless connector according to claim 1, wherein a plurality of the rotation-side light elements are provided at arbitrary positions on the disc face of the rotating body, and a plurality of the fixed-side light elements are provided on the fixed body, and wherein the plurality of the fixed-side light elements are provided on the fixed body such that, when the fixed-side light elements are positioned on the light path line segment of incidence and reflection of the reflecting body with the rotation-side light elements, the light paths are formed via the reflecting body with the rotation-side light elements.

8. The contactless connector according to claim 1, wherein rotation-side light-emitting elements and rotation-side light-receiving elements are provided intermixed at arbitrary positions on the disc face of the rotating body, fixed-side light-receiving elements which receive light emitted from the rotation-side light-emitting elements and fixed-side light-emitting elements which emit light toward the rotating-side light-receiving elements are provided intermixed on the fixed body, and wherein
  the fixed-side light-receiving elements and the fixed-side light-emitting elements are provided intermixed such that, when the fixed-side light-emitting elements or the fixed-side light-receiving elements are positioned on the light path line segment of incidence and reflection by the reflecting body with the rotation-side light-receiving elements or the rotation-side light-emitting elements, the light path is formed with the rotation-side light-emitting elements or with the rotation-side light-receiving elements via the reflecting body.

9. The contactless connector according to claim 1, wherein the rotation-side light element and the fixed-side light element, in a plane substantially orthogonal to the rotation axis, are placed in a plurality of stages, substantially orthogonal to the rotation axis, on the rotating body and on the fixed body respectively, and in each stage the light path is formed between the rotation-side light element and the fixed-side light element.

10. The contactless connector according to claim 1, further comprising a switching unit to which data received as encoded light by the rotation-side light element or by the fixed-side light element is input, and which outputs the data to the requested output stage among a plurality of output stages.

11. The contactless connector according to claim 1, further comprising a rotating transformer comprising a transformer core and a transformer winding provided at each of the rotating body and the fixed body.

12. The contactless connector according to claim 1, further comprising a blind mating function, wherein the rotating body and the fixed body are mutually joinable, and the light path is formed between the rotation-side light element and the fixed-side light element, regardless of the position of the rotating body in the direction of rotation of the rotating body upon joining.

13. The contactless connector according to claim 1, wherein the fixed-side light element is placed at a height different from that of the rotation-side light element in the rotation axis direction, and the rotation-side light element is placed at an angle, relative to the plane face of the rotating body orthogonal to the rotation axis, such that the light path is formed with the fixed-side light element.

14. The contactless connector according to claim 1, wherein the rotation-side light element and the fixed-side light element comprise optical fibers, and the light path is formed between the optical fibers.

15. The contactless connector according to claim 1, wherein
  a width of the reflecting body is thinner than a width of a light emitted from the rotation-side light element and the fixed-side light element, and
  the light path is formed without interruption between the rotation-side light element and the fixed-side light element via or not via the reflecting body so that, a light emitted from the rotation-side light element and the fixed-side light element is not reflected by the reflecting body and received by the fixed-side light element and the rotation-side light element, respectively, when the reflecting body is positioned parallel on a straight line connecting the rotation-side light element and the fixed-side light element, and a light emitted from the rotation-side light element and the fixed-side light element is reflected by the reflecting body and received by the fixed-side light element and the rotation-side light element, respectively, when the reflecting body is not positioned parallel on the straight line connecting the rotation-side light element and the fixed-side light element.

* * * * *